United States Patent

Gilbert et al.

Patent Number: 5,360,157
Date of Patent: Nov. 1, 1994

[54] WELDING NOZZLE POSITION MANIPULATOR

[75] Inventors: Jeffrey L. Gilbert, Van Nuys; David A. Gutow, Thousand Oaks, both of Calif.

[73] Assignee: The United States of America as represented by the Administrator of the National Aeronautics and Space Administration, Washington, D.C.

[21] Appl. No.: 114,043

[22] Filed: Aug. 31, 1993

[51] Int. Cl.⁵ .............................................. B23K 37/02
[52] U.S. Cl. ........................................ 228/45; 228/32
[58] Field of Search ................ 228/45, 32; 219/141, 219/143, 75

[56] References Cited

U.S. PATENT DOCUMENTS

| | | | |
|---|---|---|---|
| 2,360,160 | 10/1944 | Pickhaver | 219/75 |
| 2,381,355 | 8/1945 | Laughton | 219/75 |
| 2,726,619 | 12/1955 | Tschudi | 228/32 |

FOREIGN PATENT DOCUMENTS

| | | | |
|---|---|---|---|
| 58-179573 | 10/1983 | Japan | 219/61 |
| 598751 | 3/1978 | U.S.S.R. | 228/45 |

OTHER PUBLICATIONS

NASA Tech Briefs, Jan. 1993 vol. 17 No. 1, p. 80, Title: Adjustable Bracket for Entry of Welding Wire Authors: Jeffrey L. Gilbert and David A. Gutow.

Primary Examiner—P. Austin Bradley
Assistant Examiner—Jeffrey T. Knapp
Attorney, Agent, or Firm—Robert L. Broad, Jr.; Guy M. Miller; Alan J. Kennedy

[57] ABSTRACT

The present invention is directed to a welding nozzle position manipulator. The manipulator consists of an angle support to which the remaining components of the device are attached either directly or indirectly. A pair of pivotal connections attach a weld nozzle holding link to the angle support and provide a two axis freedom of movement of the holding link with respect to the support angle. The manipulator is actuated by a pair of adjusting screws angularly mounted to the angle support. These screws contact a pair of tapered friction surfaces formed on the upper portion of the welding nozzle holding link. A spring positioned between the upper portions of the support angle and the holding link provides a constant bias engagement between the friction surfaces of the holding link and the adjustment screws, so as to firmly hold the link in position and to eliminate any free play in the adjustment mechanism. The angular relationships between the adjustment screws, the angle support and the tapered friction surfaces of the weld nozzle holding link provide a geometric arrangement which permits precision adjustment of the holding link with respect to the angle support and also provides a solid holding link mount which is resistant to movement from outside forces.

12 Claims, 2 Drawing Sheets

WELDING NOZZLE POSITION MANIPULATOR

ORIGIN OF THE INVENTION

This invention was made with government support under contract NAS8-40000 awarded by the National Aeronautics and Space Administration. The Government has certain rights in this invention.

BACKGROUND OF THE INVENTION

1. Field of the Invention

This invention relates generally to a wire feed welding apparatus and specifically to an improved device for manually adjusting the position of the wire feed nozzle utilized on automatic welding apparatuses.

2. Description of the Related Art

Adjustable devices for positioning the nozzle of wire feed welding apparatuses are well known and are commonly referred to as manipulators. Most such devices have been unsatisfactory for use in modern systems wherein size, durability, accuracy, and ease of operation have become increasingly important. Typically, existing positioning devices are quite bulky. These devices do not combine the pinpoint accuracy required by modern welding equipment with the ruggedness required to survive long periods of exposure to the severe environment which surrounds the immediate arc area of such welding equipment.

SUMMARY OF THE INVENTION

The present invention is directed to a manipulator for accurately positioning a wire feed welding nozzle. The invention is primarily for welding apparatuses which employ Through-The-Torch Vision (T3V) torch and effector. These apparatuses utilize a miniature high resolution video camera which collects the weld joint image coaxially through a series of lenses and other optical components. The image is analyzed to derive information and then processed by a computer system which controls a welding robot and torch in real-time. The apparatuses require an easily adjustable wire feed nozzle manipulator which is adapted for location a distance from the nozzle tip sufficient to provide an unincumbered view of the welding area by the video camera. However, the manipulator remains within the area of the weld operation which subjects it to the severe environment inherent in the welding operation. Accordingly, the manipulator is adapted for simple attachment to a shielding mounting bracket. The manipulator is mounted to a welding apparatus by means of an angle support to which all other components of the manipulator are attached, either directly or indirectly. Pivotal connections are provided for mounting a weld nozzle holding link to the angle support and provide a two axis freedom of movement of the holding link with respect to the support angle. The manipulator is actuated by a pair of angularly mounted adjusting screws which contact a pair of tapered friction surfaces formed on the upper portion of a welding nozzle holding link. A spring located between the support angle and the upper portion of the holding link provides a constant bias engagement between the friction surfaces of the holding link and the adjustment screws, so as to firmly hold the link in position and to eliminate any free play in the adjustment mechanism. The angular relationships between the adjusting screws, the angle support and the tapered friction surfaces of the weld nozzle holding link provide a geometric arrangement which permits precision adjustment of the holding link with respect to the angle support and also provides a solid mounting which is highly resistant to movement from outside forces. The invention provides several additional unique features which will be set out hereinafter. While the invention was designed primarily for use with the welding apparatuses which employ Through-The-Torch Vision (T3V) torch and effector, it may also be utilized with conventional torch apparatuses to alleviate interferences between the wire guide nozzle and the welding apparatus or the weldment.

It is, therefore, an object of this invention to provide a welding nozzle manipulator which is light weight, compact and robust.

It is a further object of this invention to provide a welding nozzle manipulator which is capable of precision adjustment of the nozzle of a welding device by means of simple manual controls.

It is another object of this invention to provide a welding nozzle manipulator which is capable of accurately maintaining the position of the nozzle tip of an automatic welding apparatus within the severe environment surrounding the welding area of such automatic welding apparatus.

It is yet another object of this invention to provide a welding nozzle manipulator which overcomes the shortcomings of previous manipulators.

These and other objects of the present invention will become apparent to those skilled in the art, as the description proceeds.

DESCRIPTION OF THE PREFERRED EMBODIMENT

Figures 1, 2, 3, 4:
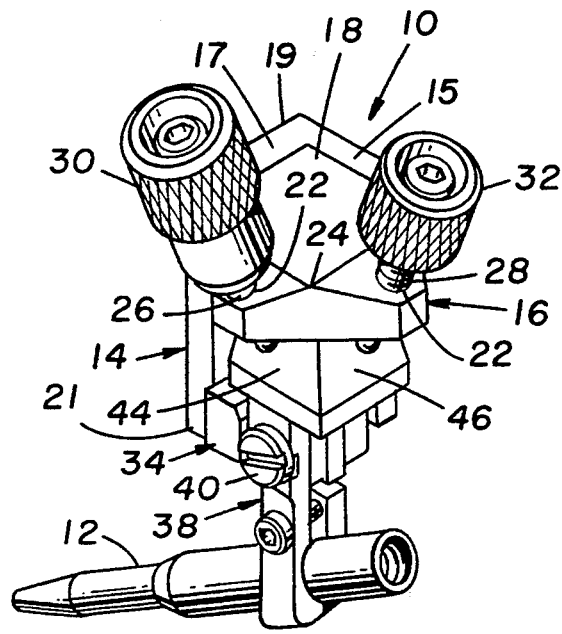
FIG. 1 is a perspective view of a welding nozzle manipulator such as is the subject of the invention, and is illustrated with a welding wire nozzle attached thereto.
FIG. 2 is a front elevation, in partial section, of the welding nozzle manipulator.
FIG. 3 is a side elevation, in partial section, of the welding nozzle manipulator illustrated in FIG. 2, as viewed from the right side thereof.
FIG. 4 is a side elevation of the welding nozzle manipulator illustrated in FIG. 2, as viewed from the left side thereof.
Figure 5:
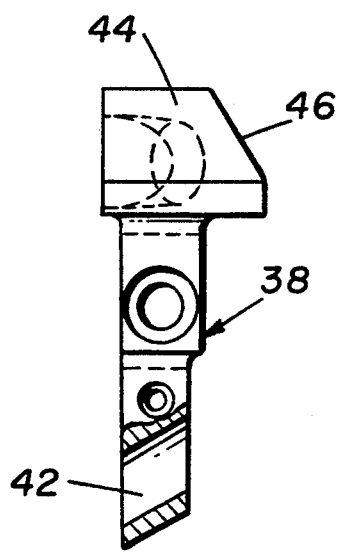
FIG. 5 is a front elevational, in partial section, of the holding link of the welding nozzle manipulator.

Referring now to FIG. 1 of the drawings, the welding nozzle manipulator which is the subject of this invention is referred to generally by the numeral 10, and is illustrated in conjunction with a wire feed welding nozzle 12 which is to be positioned by the manipulator. An angle support 14, includes legs 15 and 17 adjoining at approximately ninety degrees, and upper and lower end 19 and 21 respectively. The angle support 14 provides the basic support for the components of the welding nozzle manipulator, as well as a means for mounting the manipulator to a welding apparatus (not shown). A manipulator screw bracket 16 is attached at one end 18 to the upper end 19 of the angle support 14, and in perpendicular relationship thereto, by bolts 20 (best illustrated in FIG. 4). A pair of threaded apertures 22 are located at the distal end 24 of the manipulator screw bracket 16. A pair of manipulator screws 26 and 28 are threadedly engaged, one in each of the apertures 22. It will be noted that the screws 26 and 28 enter the bracket at an angle of approximately seventy degrees with respect to the horizontal lower surface of the bracket 16 (best illustrated in FIG. 3). Reference is now made to FIG. 2. To provide the required lateral positioning of the nozzle 12 the screw 26 is longer than the screw 28 which provides elevational positioning of the tip of the nozzle 12. For ease of operation and identification, the longer screw 26 is provided with a knob 30 which is elongated and is positioned higher as compared to the knob 32 of the shorter screw 28. The details of this arrangement will be discussed in detail hereinafter. A fulcrum 34 is pivotally attached by means of a shoulder bolt 36 to the lower end 21 of angle support 14. The shoulder bolt 36 may be configured and adjusted to provide the required frictional relationship between the fulcrum 34 and the support angle 14. The fulcrum 34 in turn provides a mounting base for a holding link 38 which is pivotally attached thereto by means of a shoulder bolt 40. The shoulder bolt 40 provides an adjustable friction control between the holding link 38 and the fulcrum 34. Because of the considerable lever arm distance between the tip of the nozzle 12 and the holding link 38, and because of the increased need to accurately adjust the elevation of the nozzle tip, a unique frictional arrangement between these components is provided. The details of this arrangement will be discussed in detail hereinafter. It will be noted that the axes of these perpendicularly positioned pivots are located in the same horizontal plane and provide a two axis freedom of movement of the holding link 38 with respect to the angle support. A compression clamp 42 is formed at one end of the holding link 38, and a pair of tapered frictional surfaces 44 and 46 are formed at the opposite end thereof. The frictional surfaces 44 and 46 are engaged by spherical tips 48 and 50 formed on the ends of the manipulator screws 26 and 28. A compression spring 52 is mounted between the angle support 14 and the holding link 38 adjacent to and behind the tapered friction surfaces 44 and 46 of the holding link 38. This spring is retained in place by tapered holes (not shown) formed in the area of convergence of the legs 15 and 17 of angle support 14 and in the rear corner 39 of the holding link 38. The spring 52 serves to bias the friction surfaces 44 and 46 against the spherical tips 48 and 50 of the manipulator screws 26 and 28 so as to firmly hold the link in position and to eliminate any free play in the adjustment mechanism.

Figure 6:
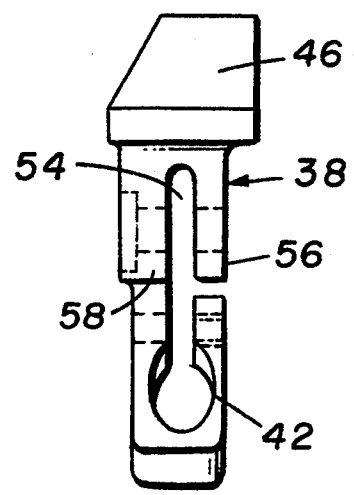
FIG. 6 is side elevation of the holding link of the welding nozzle manipulator illustrated in FIG. 5, as viewed from the right side thereof.
Figure 7:
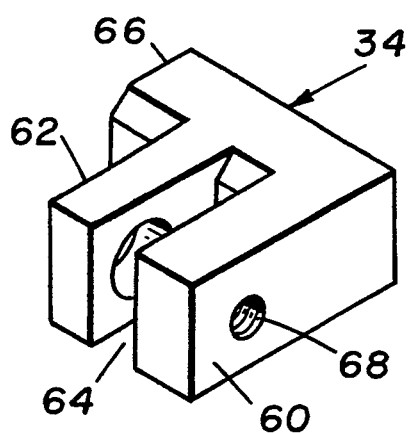
FIG. 7 is a perspective view of the fulcrum by which the holding link is attached to the welding nozzle manipulator.

Referring now to FIGS. 3 through 6, it will be noted that the holding link 38 is a unitary element which incorporates a novel configuration wherein a friction fitting arrangement providing multiple friction surfaces is utilized between the fulcrum 34 and the holding link 38. More specifically, and as best illustrated in FIG. 6, an opening 54 is formed between an extension 56 and a support wall 58. As illustrated in FIG. 7, the fulcrum 34 includes a pair of ears 60 and 62 which define an opening 64. An attachment lug 66 which is adapted to receive shoulder bolt 36 is also illustrated. Referring again to FIG. 3, the above mentioned novel friction fitting arrangement is formed by the insertion of the ears 60 and 62 of the fulcrum around the extension 56 of the holding link 38. Thus it will be understood that this sandwiching arrangement provides multiple interfacing friction surfaces. Use of these several friction surfaces provides a smooth yet powerful frictional relationship between the holding link 38 and the fulcrum 34 which permits a positive and accurate adjustment of the critical tip elevation of the weld nozzle 12. Adjustment of the desired friction is accomplished by the compression applied to the friction surfaces by the shoulder bolt 40. The bolt 40 passes through apertures appropriately provided in the holding link 38 and the fulcrum 34, and is threadedly attached to the threaded aperture 68, formed in the fulcrum ear 60.

As illustrated in FIG. 3, the obtuse angle as measured from the lower portion of the tapered friction surface 44 upwardly to the manipulator screw 26 is approximately one hundred thirty degrees. As is clear from the drawings a similar relationship exists between the tapered friction surface 46 and its abutting screw 28. Each of the manipulator screws 26 and 28 defines an angle of approximately seventy degrees with respect to the manipulator screw bracket 16. The angular relationships between the adjusting screws 26, 28, the screw bracket 16 and the tapered friction surfaces 44, 46 of the holding link 38, provide a geometric arrangement which permits precision adjustment of the holding link with respect to the angle support and also provides a solid mounting which is highly resistant to movement from outside forces. For best operation of the device each of the recited angles which make up this angular relationship should be maintained within plus or minus ten degrees.

In operation, manipulation of the tip of the weld wire nozzle 12 is accomplished by rotation of the manipulator screws 26 and/or 28. As pointed out above rotation of the short screw 28 effects an elevational motion to the tip of the nozzle 12, while rotation of the longer screw 26 effects the nozzle's lateral movement. More specifically, a downward adjustment of screw 28 exerts an inward force against the friction surface 46 of the holding link 38. This force causes an inward movement of the upper portion of the holding link against the bias of the spring 52 as the holding link 38 rotates about the pivot formed by shoulder bolt 40. As the upper portion of the holding link 38 moves inwardly, the lower portion thereof, which includes the compression clamp 42, moves in the opposite direction. This movement of the holding link 38 in turn moves the tip of nozzle 12 in a downward direction. Adjustment of the longer screw 26 would have a similar result on the lateral position of the nozzle 12. However, as noted above, screw 26 is longer so as to provide sufficient lateral movement of the nozzle 12, it being understood that because of the length of the nozzle a minor adjustment of the shorter screw 28 will cause a considerable change in the elevation of the tip of the nozzle 12, while adjustment of the longer screw 26 effects a comparatively lesser movement of the nozzle tip in a lateral direction.

Obviously, numerous modifications and variations of the present invention are possible in light of the above teachings. It is therefore to be understood that within the scope of the appended claims the invention may be practiced otherwise than as specifically described herein.

We claim:
1. A welding nozzle position manipulator comprising: an angle support;

a manipulator screw bracket attached at one end thereof to said angle support and provided at the distal end thereof with a pair of spaced apart threaded apertures;

a pair of manipulator screws, each of said screws being threadedly attached to one of said pair of spaced apart threaded apertures in said manipulator screw bracket;

a fulcrum;

a fulcrum pivot pivotally attaching said fulcrum to said angle support;

a holding link having a pair of tapered friction surfaces, each of said tapered surfaces being frictionally engaged with one of said pair of manipulator screws;

a holding link pivot pivotally attaching said holding link to said fulcrum; and biasing means mounted between said angle support and said holding link and adapted to bias each of said pair of frictional surfaces of said holding link against one of said pair of manipulator screws, whereby adjustment of one of said manipulator screws will pivot said fulcrum relative to said angle support and whereby adjustment of the other of said manipulator screws will pivot said holding link relative to said fulcrum.

2. A welding nozzle position manipulator as set forth in claim 1 wherein said angle support comprises an upper end and a lower end, a pair of legs adjoined so as to form an angle of approximately ninety degrees, and wherein said manipulator screw bracket is attached to the upper end of said angle support in abutting relationship with each of said pair of legs, and wherein said fulcrum is pivotally attached to one of said legs adjacent the lower end of said angle support.

3. A welding nozzle position manipulator as set forth in claim 2 wherein the pivotal axis of the said fulcrum pivot and the pivotal axis of said holding link pivot are substantially in the same plane.

4. A welding nozzle position manipulator as set forth in claim 3 wherein the pivotal axis of the said fulcrum pivot and the pivotal axis of said holding link pivot are substantially perpendicular to one another.

5. A welding nozzle position manipulator as set forth in claim 4 wherein each of said manipulator screws is provided with a spherical frictional engagement tip.

6. A welding nozzle position manipulator as set forth in claim 4 wherein said holding link includes a welding nozzle holding bracket at one end thereof and wherein said pair of tapered friction surfaces are located at the opposite end thereof, and wherein said holding link pivot is located intermediate the ends of said holding link.

7. A welding nozzle position manipulator as set forth in claim 6 wherein said holding link tapered surfaces adapted for frictional engagement with one of said pair of manipulator screws define an angle between each said surface and its engaging manipulator screw which angle is in the range of one hundred twenty to one hundred forty degrees.

8. A welding nozzle position manipulator as set forth in claim 7 wherein each of said pair of manipulator screws defines an angle between sixty and eighty degrees with respect to said manipulator screw bracket.

9. A welding nozzle position manipulator as set forth in claim 8 wherein said bias means comprises a compression spring, and wherein said compression spring is positioned adjacent said frictional surfaces of said holding link and adjacent the adjoinment of the legs of said angle support at the upper end of said angle support.

10. A welding nozzle position manipulator as set forth in claim 1 wherein said holding link includes a support wall and an extension which form an opening therebetween, wherein said fulcrum includes a pair of ears forming an opening therebetween, wherein the ears of said fulcrum are positioned snugly around the extension of said holding link, wherein one of said ears of said fulcrum is positioned snugly between said support wall and said extension of said holding link and, wherein said holding link pivot means passes through said support wall and extension of said holding link and through said pair of ears of said fulcrum, whereby said holding link and said fulcrum are provided with a frictional pivotal relationship therebetween.

11. A welding nozzle position manipulator as set forth in claim 10 wherein said holding link pivot is adapted to adjust the frictional relationship between said holding link and said fulcrum.

12. A welding nozzle position manipulator as set forth in claim 11 wherein said fulcrum pivot is adapted to adjust the frictional relationship between said fulcrum and said angle support.

* * * * *